United States Patent
Zhang et al.

(10) Patent No.: US 8,331,684 B2
(45) Date of Patent: Dec. 11, 2012

(54) COLOR AND INTENSITY BASED MEANINGFUL OBJECT OF INTEREST DETECTION

(75) Inventors: Ximin Zhang, San Jose, CA (US); Ming-Chang Liu, San Jose, CA (US)

(73) Assignee: Sony Corporation, Tokyo (JP)

( * ) Notice: Subject to any disclaimer, the term of this patent is extended or adjusted under 35 U.S.C. 154(b) by 434 days.

(21) Appl. No.: 12/723,438

(22) Filed: Mar. 12, 2010

(65) Prior Publication Data
US 2011/0222778 A1   Sep. 15, 2011

(51) Int. Cl.
*G06K 9/46* (2006.01)

(52) U.S. Cl. ........ 382/190; 382/274; 382/191; 382/240; 382/170; 382/167; 382/164; 382/165; 382/168; 382/171; 382/173; 382/254

(58) Field of Classification Search .................. 382/190, 382/274, 191, 240, 170, 167, 164, 15, 168, 382/171, 173, 254
See application file for complete search history.

(56) References Cited

U.S. PATENT DOCUMENTS

| 6,404,936 | B1 | 6/2002 | Katayama et al. | |
|---|---|---|---|---|
| 6,636,644 | B1 | 10/2003 | Itokawa | |
| 7,379,591 | B2 * | 5/2008 | Kinjo | 382/170 |
| 2005/0139782 | A1 | 6/2005 | Nagahashi et al. | |
| 2007/0292038 | A1 * | 12/2007 | Takemoto | 382/240 |

FOREIGN PATENT DOCUMENTS

WO   2009031751 A1   3/2009

* cited by examiner

*Primary Examiner* — Mike Rahmjoo
(74) *Attorney, Agent, or Firm* — John P. O'Banion

(57) ABSTRACT

An apparatus and method for detecting "Object Portraits" (photographs or images with a stand-out object of interest or a set of stand-out objects of interest) is described. A set of tools has been developed for object of interest detection, including "Sunset-like" scene detection, pseudo-color saturation-based detection and object of interest isolation, block intensity based detection and object of interest isolation. By effectively integrating these tools together, the "Object Portrait" images and "Non-Object Portrait" images are successfully identified. Meaningful object of interest areas are thereby successfully isolated in a low complexity manner without human intervention.

15 Claims, 9 Drawing Sheets

COLOR AND INTENSITY BASED MEANINGFUL OBJECT OF INTEREST DETECTION

CROSS-REFERENCE TO RELATED APPLICATIONS

Not Applicable

STATEMENT REGARDING FEDERALLY SPONSORED RESEARCH OR DEVELOPMENT

Not Applicable

INCORPORATION-BY-REFERENCE OF MATERIAL SUBMITTED ON A COMPACT DISC

Not Applicable

BACKGROUND OF THE INVENTION

1. Field of the Invention

This invention pertains generally to an apparatus and method for processing pictures, more particularly, to an apparatus and method for general object of interest detection and isolation, and still more particularly to an apparatus and method for general object of interest detection and isolation followed by a specialized treatment of the object of interest.

2. Description of Related Art

Object recognition in images is still in a relative infancy. Perhaps the most widely known object recognition is crude facial recognition incorporated in some still cameras.

The automatic object of interest identification is a somewhat difficult problem. No known published results have been located to date on general object of interest detection. Research that approaches object of interest detection can be divided roughly into two categories. The first research methodology, usually referred as "bottom-up", is completely stimulus driven or active even if there is no meaningful object in the image. Saliency point detection belongs to the "bottom-up" category. The second research methodology, usually referred to as "top-down", is both slower and task dependent. "Top-down" methods focus on specified object categories. Face recognition is one such specified object categories.

In face recognition, object recognition tasks have well defined features such as eyes, nose or mouth that are relatively simple to detect within an image. However, a general object of interest detection method cannot be made task specific since it is a-priori unknown which features or categories may be of interest. Therefore, an object detector should be sufficiently generic so as to be capable of handling large numbers of object categories. While fast and highly accurate object detectors are currently available for some categories, such as faces and cars, their application to other classes is problematic. On the other hand, the stimulus driven approach appears to be unable to lead to a conclusion as to whether or not there is a meaningful object of interest within an image.

BRIEF SUMMARY OF THE INVENTION

An aspect of the invention is a method of object portrait processing, comprising: providing an input image; determining on a computer whether the input image is sunset-like; if the input image is not sunset-like, then determining if one or more objects of interest are present; and outputting to a computer readable memory object of interest information.

The step of determining whether the input image is sunset-like may comprise: performing the following sunset-like scene checks until at least one check is logically "true", wherein the checks consist of: a. a Bright Block Color_sat Check; b. a Corner Bright Block Check; c. a Dark Block Check; d. an Overall Intensity Check; and e. a Boundary Block Variance Check. Here, the method of object portrait processing may comprise: outputting a logically "true" sunset scene detection result when all of the sunset-like scene checks are logically "true".

In the method above, the step of determining if one or more objects of interest are present may comprise: performing pseudo-color saturation based detection; performing intensity-based detection; or 1) performing pseudo-color saturation based detection; and 2) performing intensity-based detection.

In the method of object portrait processing above: if a pseudo-color saturation output, from the performing pseudo-color saturation based detection step, is greater than zero; or if an intensity output, from the performing intensity-based detection step, is greater than zero; then performing an object of interest isolation step.

The performing pseudo-color saturation based detection step may comprise: generating a block based pseudo-color saturation map; performing a pseudo-color saturation map quantization; performing a color candidates selection; and performing a stand-out color criterion check.

The performing the color candidates selection step may comprise:

outputting candidates from the following tests: performing a pseudo-color saturation histogram calculation; performing a pseudo histogram peak check; performing a "Cliff" point check; performing a "Fall" point check; performing a candidate similarity threshold calculation; performing an extract candidate check; and if the extract candidate check results in a logical "true" output, then performing a hypothesis candidate extraction.

The stand-out color criterion check step above may comprise: calculating a block based pseudo-color saturation map; performing a 4-partition based centroid extraction; performing a candidate seeds selection; and performing a centroid around growing step.

The centroid around growing step above may comprise: performing a growing path initialization; performing a similar block check; performing a boundary check; and if a validate check is true, then outputting a growing shape.

Another aspect of the invention is that a computer may be capable of performing the method of object portrait processing described above.

A still further aspect of the invention is that a computer program executable, stored on a computer readable medium, may be capable of performing the method of object portrait processing described above.

In still another further aspect, an apparatus may comprise the computer described above. The apparatus may further comprise: a display, whereupon object of information may be displayed.

In another aspect of the invention, an apparatus capable of detecting one or more objects of interest within an image may comprise: a computer capable of: determining if an input image is sunset-like; and if the input image is not sunset-like, then capable of determining if one or more objects of interest are present; a computer readable memory comprising object of interest information when the input image is not sunset-like.

The apparatus above may further comprise a display, whereupon object of interest information may be displayed.

Further aspects of the invention will be brought out in the following portions of the specification, wherein the detailed description is for the purpose of fully disclosing preferred embodiments of the invention without placing limitations thereon.

BRIEF DESCRIPTION OF THE SEVERAL VIEWS OF THE DRAWING(S)

The invention will be more fully understood by reference to the following drawings which are for illustrative purposes only:

DETAILED DESCRIPTION OF THE INVENTION

I. Definitions

Figure 1:
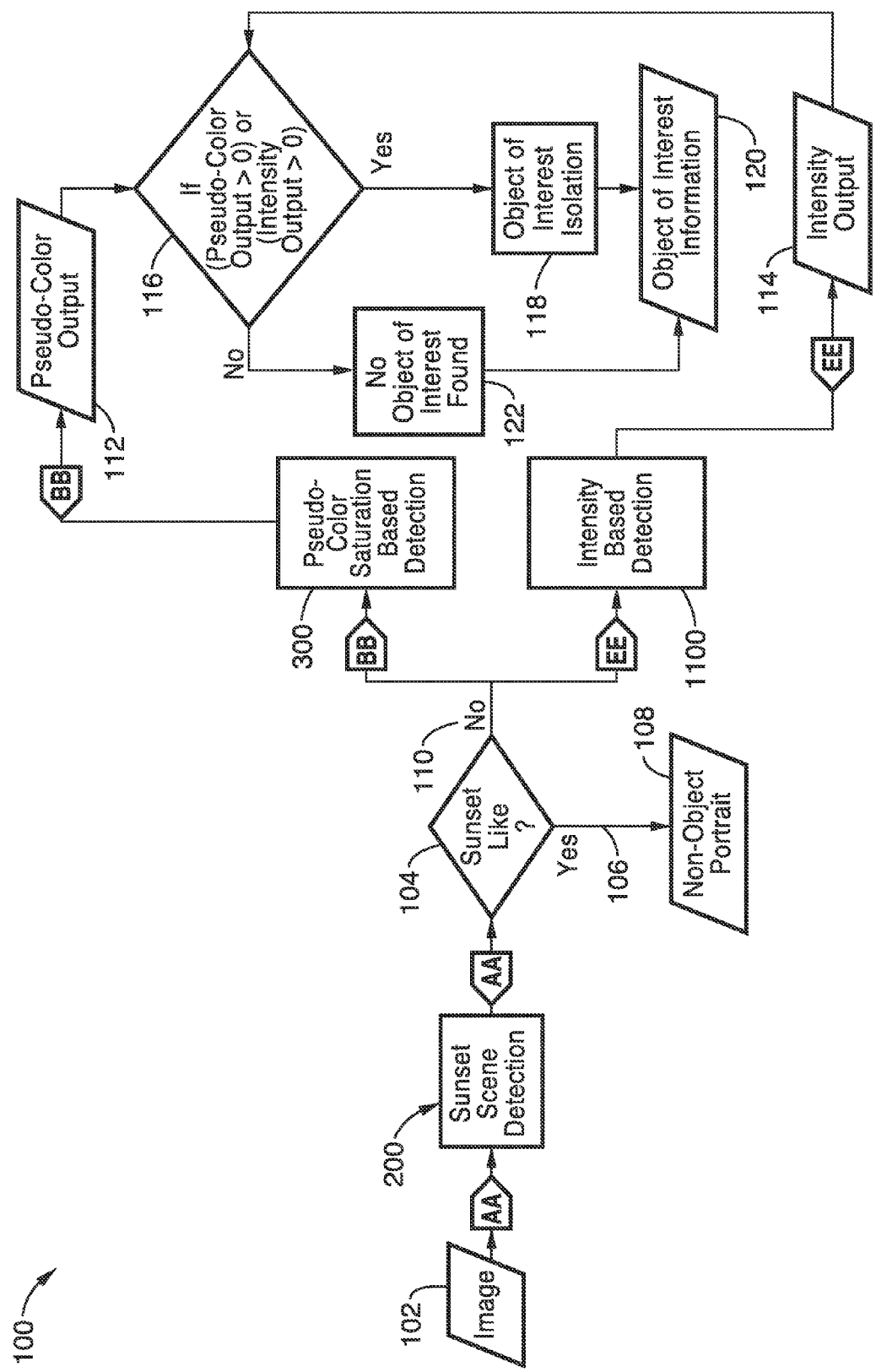
FIG. 1 is a flowchart of an overall method of object portrait detection.

The following terms are used herein and are thus defined to assist in understanding the description of the invention(s). Those having skill in the art will understand that these terms are not immutably defined and that the terms should be interpreted using not only the following definitions but variations thereof as appropriate within the context of the invention(s).

"Computer" means any device capable of performing the steps, methods, or producing signals as described herein, including but not limited to: a microprocessor, a microcontroller, a video processor, a digital state machine, a field programmable gate array (FGPA), a digital signal processor, a collocated integrated memory system with microprocessor and analog or digital output device, a distributed memory system with microprocessor and analog or digital output device connected by digital or analog signal protocols.

"Computer readable medium" means any source of organized information that may be processed by a computer to perform the steps described herein to result in, store, perform logical operations upon, or transmit, a flow or a signal flow, including but not limited to: random access memory (RAM), read only memory (ROM), a magnetically readable storage system; optically readable storage media such as punch cards or printed matter readable by direct methods or methods of optical character recognition; other optical storage media such as a compact disc (CD), a digital versatile disc (DVD), a rewritable CD and/or DVD; electrically readable media such as programmable read only memories (PROMs), electrically erasable programmable read only memories (EEPROMs), field programmable gate arrays (FGPAs), flash random access memory (flash RAM); and information transmitted by electromagnetic or optical methods including, but not limited to, wireless transmission, copper wires, and optical fibers.

"Object of Interest" means one or more components (or objects) of an image that was a predominant reason for a photographer taking the image. In an image of an animal, the animal is the object of interest. Similarly, with people, pets, cars, etc., typical compositions comprise the respective subject as the object of interest, with the remainder of the image not the object of interest. Group images may present several objects of interest, such as faces, dresses, cars, bicycles, etc.

By contrast, in an image of a landscape, the landscape generally has no single object of interest, and a photographer is interested in the overall composition of the image, and not a particular object of interest. Similarly, in a sunset image, there may generally no defined object of interest. Special cases of the foregoing may include flash filled photography of subjects in a foreground of sunsets or landscapes, where the background may not be the object of interest and the subject is the object of interest, with perhaps equal aesthetic weighting of the two elements in the composition.

Referring more specifically to the drawings, for illustrative purposes the present invention is embodied in the apparatus generally shown in FIG. 1 through FIG. 11. It will be appreciated that the apparatus may vary as to configuration and as to details of the parts, and that the method may vary as to the specific steps and sequence, without departing from the basic concepts as disclosed herein.

II. Introduction

Many applications in image processing require the identification of an "object of interest". Examples addressing such "objects of interest" include, without limitation: images that may be displayed with higher detail on a human face and lower detail in the background; the object of interest can be subject to better error correction to achieve an optimum trade-off between image transmission reliability and efficiency; or images can be encoded with spatially varying bit rates so as to guarantee higher fidelity in regions that are deemed of more importance to their viewers. Other important applications include intelligent personal image management and various image classification tasks.

Within the context of an image recording device, such as a digital still camera or video camera, it is conceivable that real-time object of interest detection may be used to assign a particular focus point to the object of interest, thereby ensuring that the object of interest is kept in focus and thereby recorded in focus.

In particular, in still portraiture, it is well known to professional photographers that if one of more of the subject's eyes is in focus, then the resulting portrait will be visually pleasing. However, many amateurs do not know this concept, or how to effect the concept on a particular camera. Thus, for instance, if an optical recording device were able to discern and focus on eyes, it would probably be better received in the marketplace as a competitive advantage.

Here, the term "Object Portrait" is used to represent a photograph or image with a stand-out object of interest or a set of stand-out objects of interest. Object Portrait is arguably the most important category of personal photo collections. One goal of this application is to detect "Object Portrait" type images and then isolate the object of interest area in a low complexity way without any human intervention.

A set of tools has been developed for "Object Portrait" detection, including: pseudo-color saturation based detection and object of interest isolation; block intensity based detection and object of interest isolation; and sunset like distraction removal. By effectively integrating these tools together, the "Object Portrait" and "Non-Object Portrait" images are successfully identified. In this manner, meaningful objects of interest are successfully isolated.

III. Overall Method Description

Refer now to FIG. 1, which is a flowchart of an overall architecture of the "Object Portrait" method 100. Initially, an input image 102 must first be determined (in sunset scene detection 200) whether 104 the input image 102 resembles a typical sunset-like image 106, or not 110. If the input image 102 is detected as sunset-like image 106, then most likely the photographer's intention was to capture an overall scene feeling instead of an object of interest. In this case, the sunset scene detection 200 outputs information indicating that the image 102 is a non-object portrait 108 type of image.

In a non-object portrait 108 image, the viewer's focus will also likely be on the entire scene, and not some small portion of the image containing an object of interest. Therefore, if the input image 102 is detected as a sunset-like image, then the image is taken to be a non-object portrait 108. The sunset-like image detection 200 method is described in detail below.

When the input image 102 is not 110 taken as a sunset-like image, then it is further processed by two processing units: the pseudo-color saturation based detection module 300, and the intensity based detection module 1100.

In the pseudo-color saturation based detection module 300, a block based pseudo-color saturation value is extracted by using the difference of the mean of the blue chrominance (Cb) (in a YCbCr color space) and red chrominance (Cr) for each 4×4 pixel block in the image 102. Based on the extracted values, a histogram is calculated and several candidates are selected according to the distribution of the histogram. A seed decision scheme is then used to find the qualified seeds. If there are qualified seeds, a center around growing scheme is used to grow based on the similarity of the seeds and blocks along the growing path. After the growing is finished, a compactness value is calculated. An object portrait decision is then based on the compactness value. If the decision is negative, a centroid around location variance is further used to estimate a new compactness value. If the compactness value is larger than a threshold, object portrait decision returns positive. The object portrait decision is output as the pseudo-color output 112.

In the intensity based detection module 1100, a block based intensity value is extracted by calculating the mean of luminance (Y) of each 8 pixel by 8 pixel (8×8) block in the image. Based on the extracted value, a histogram is calculated and several candidates are selected according to the distribution of the histogram. A seed decision scheme is then used to find the qualified seeds. If there is a qualified seed, a center around growing scheme is used to grow based on the similarity of the seeds and blocks along the growing path. After the growing is finished, a compactness value is calculated. An object portrait decision will be made based on the compactness value. If the compactness value is larger than a threshold, object portrait decision returns positive. Otherwise, the object portrait decision returns negative. Here, the object portrait decision is output as the intensity output 114.

If either the pseudo-color output 112 or the intensity output 114 is positive 116, then processing continues to an object of interest isolation module 118, and outputs the object of interest information 120. Otherwise, the process sets a "no object of interest" state 122, and continues to output the object of interest information 120.

The technical details of each of the above modules are described in the following sections.

IV. Sunset-Like Scene Detection

Sunset and sunrise picture are among the most important image categories due to their great natural beauty. When people shoot sunset or sunrise pictures, their intention is generally to capture the feeling of the scene. Therefore, the possibility that the sunset picture is also an object portrait is very small (additionally, advanced photographic techniques such as flash fill would be required to generate a pleasing object portrait with such a background). Since sunset pictures usually have very saturated color, a concentrated bright area, and an abrupt intensity change, some sunset pictures have statistics very similar to other typical object portraits, which may result in false sunset-like scene detections. To solve this problem, the method here starts with the detection of sunset images.

Apparently, most of the current sunset detection methods are training based. The accuracies of these methods are highly correlated with input training and testing data. In the method described here, however, a low complexity deterministic method is used. This method can be used to successfully detect typical sunset pictures.

Based on a study of sunset images, it has been found that the most beautiful sunset generally occur within a very short period before it is fully dark outside. Most sunset pictures are taken during this period to best capture the natural beauty of the scene. By analyzing many such sunset pictures, it has been found that they have the following common features:

a) there are very saturated orange to red colors in the bright area;

b) there is relatively lower luminance (dark area) in the two lower corners of the image:

c) there are dark areas with a certain size;

d) the overall feeling of the whole picture is relative dark; and e) there are both vertical and horizontal intensity changes.

Figure 2:
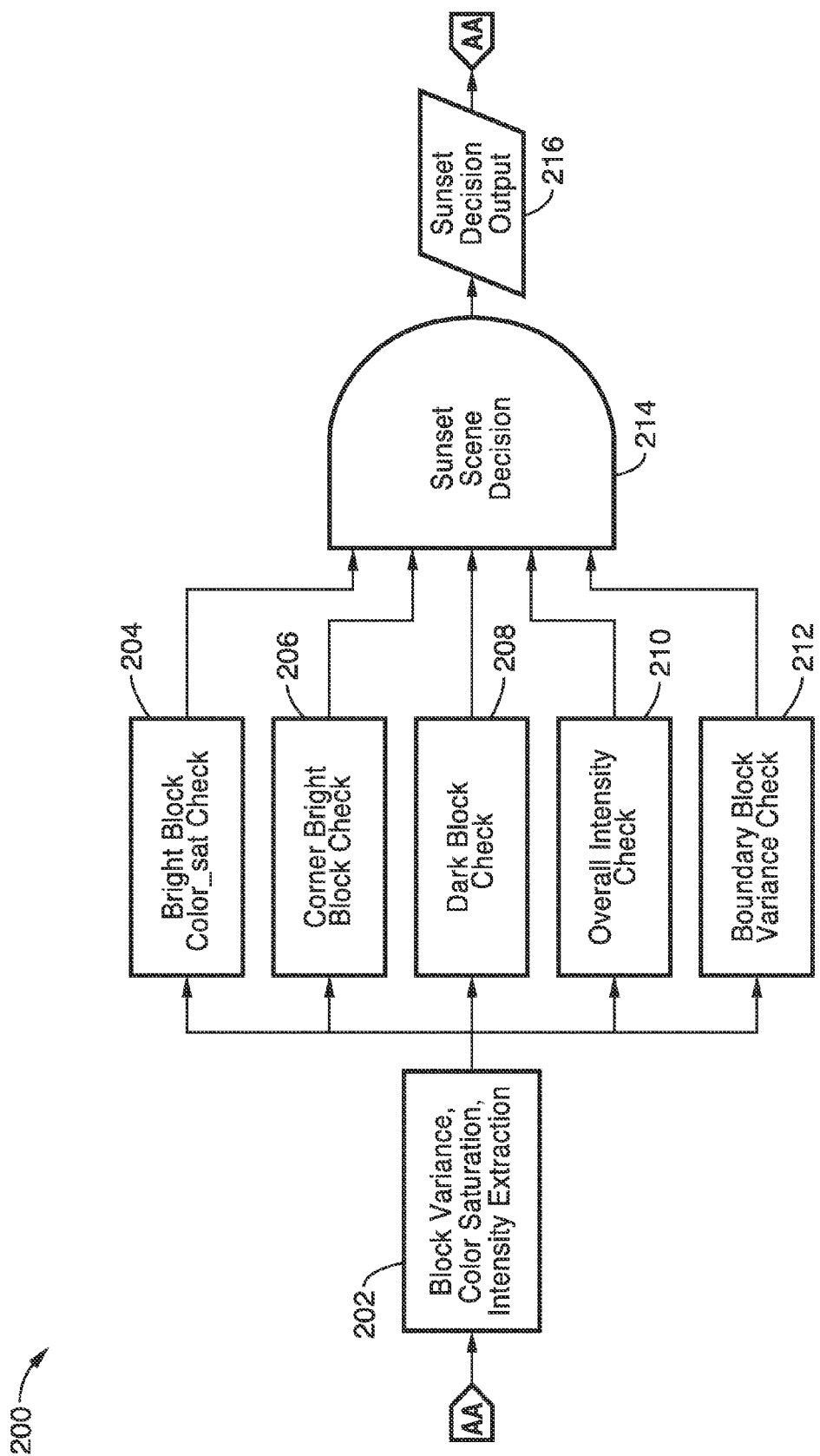
FIG. 2 is a flowchart of a method of sunset scene detection.

Refer now to FIG. 2, where the sunset detection method is described 200.

Initially, block intensity, block variance, and pseudo-color saturation 202 values are calculated for each 8×8 pixel block in the image 102 as follows. Block intensity is calculated by $$\sum_{i=0,j=0}^{i=7,j=7} P(i, j)$$

and the block variance is calculated by $$VAR = \frac{1}{64} \sum_{i=0,j=0}^{i=7,j=7} \left( P(i, j) - \frac{1}{64} \sum_{i=0,j=0}^{i=7,j=7} P(i, j) \right)^2,$$

where P(i, j) denotes the pixel intensity value in the Y channel of image 102 position (i, j). The pseudo-color saturation process is described below in Section V.

Next, the number of bright blocks (block intensity within certain range) that satisfy a color saturation criterion (red to orange) is counted in the module "Bright Block Color_sat Check" 204. The number of bright blocks (block intensity larger than a threshold) in the two bottom corner of the image is counted in the module "Corner Bright Block Check" 206. The number of dark blocks (block intensity less than a threshold) in the image is counted in the module "Dark Block Check" 208. The average block intensity is calculated in the module "Overall Intensity Check" 210. The number of flat blocks (block variance less than a threshold) along the top, left and right image boundary is counted in the module "Boundary Block Variance Check" 212. Each of these various checking methods is explained further below.

The outputs of the above five modules are processed in a "Sunset Scene Decision" module 214 to make the decision of whether the image is a sunset image, and output as a "Sunset Decision Output" 216, which is "true" if there is a sunset-like image detected in the image 102, and "false" otherwise.

Sunset Detection

The following methods are applied in the modules "Bright Block Color_sat Check" 204 and "Corner Bright Block Check" 206.

Initially, two sunset index counters, counter1 and counter2, are set to zero. Next, all of the blocks in the image 102 are checked. Also, K is assigned a relatively large value, which is the number of 8×8 pixel blocks in a single row of the image 102.

Bright Block Color_sat Check 204

If the block intensity is larger than a first threshold (80) and less than second threshold (240), and the color saturation is larger than third threshold (96), then the counter1 value is increased by one. If the color saturation is larger than a fourth threshold (128), then the counter1 value is increased by the large value K. If the color saturation is less than 64, then the counter2 value is increased by one.

Corner Bright Block Check 206

Next, the blocks in the lower left and lower right corners of image 102 are checked. If their intensity is larger than a fifth threshold (56), then the counter1 value is increased by K/4.

After all of the blocks in the image 102 are processed, if the counter1 value is less than K and counter2 value larger than a sixth threshold (K/4), then the "Bright Block Color_sat Check" 204 is satisfied for sunset picture, resulting in a Boolean "true" output.

Dark Block Check 208

The number of dark blocks is checked in the module "Dark Block Check" 208. If the resultant counter value mean_C is larger than a threshold (3K), then the "Dark Block Check" test is satisfied for a sunset picture, resulting in a Boolean "true" output.

Overall Intensity Check 210

Next, the block intensity for the entire picture is checked in the module "Overall Intensity Check" 210. If the mean is less than a threshold (64), then the "Overall Intensity Check" quality is satisfied for a sunset picture, resulting in a Boolean "true" output.

Boundary Block Variance Check 212

The number of constant intensity blocks in the image is tested in the module "Boundary Block Variance Check" 212. If the counter value Boundary_index is less than a threshold (the number of 8×8 blocks in one row added to the number of 8×8 blocks in one column in the image 102), then this test is satisfied for a sunset picture, resulting in a Boolean "true" output.

Finally, a sunset scene decision 214 is made by determining if all of the five preceding five tests have successfully indicated that a sunset scene is present in the image 102, as evidenced by all five Boolean "true" inputs. If any one of the tests indicates that a sunset scene is not present in image 102, then the remaining tests need not be performed. The output from the sunset scene decision 214 is the sunset decision output 216, a Boolean, which is "true" if a sunset has been detected and "false" otherwise.

V. Pseudo-Color Saturation Based Object Portrait Detection

One important feature that differentiates an object of interest with its surrounding area is color. A very colorful object is easy detected by humans. There are many objects that can be differentiated from their surroundings with only color information, such as, flowers, animals, and many manmade objects. Motivated by this observation, a pseudo-color saturation based object portrait detection scheme was developed.

There are many formats used to store color images. The most popular color spaces include (red, green, blue) (RGB), (hue, saturation, value) (HSV), and (luminance, blue chroma, red chroma) $(Y, C_b, C_r)$, among many others. Since most of the compression and transmission standard is based on the $(Y, C_b, C_r)$ format, the method described here is focused on the $(Y, C_b, C_r)$ format.

Theoretically, a true color can only be represented by a three dimensional (3D) combination of the $(Y, C_b, C_r)$ channels. Since the object here is to develop a low complexity method for object portrait detection, a one dimensional (1D) based method is desirable so long as it can perform well on the task of object portrait detection. It has been found that difference among $C_b$ and $C_r$ valued can perform well in object portrait detection. A one dimensional color feature denoted here as "pseudo-color saturation" is extracted as follows:

$$Saturation_{pseudo-color} = \begin{cases} 0 & \text{if } S_1 < 0 \\ S_1 & \\ 255 & \text{if } S_1 > 255 \end{cases} \quad \text{Eq. 1}$$

where $$S_1 = \begin{cases} 128 + 2*(C_b - C_r) & \text{if } C_r > 170 \\ 128 & \text{if } C_b < 128 \text{ and } C_r < C_b \\ 128 + (C_b - C_r) & \text{Otherwise} \end{cases}$$

It is noted that "pseudo-color saturation" is not "real" color saturation according to standard definitions. It is instead a term meant to describe the extracted feature above. In Eq. 1, a multiplication by 2 is used if $C_r>170$ (hence the 2* multiplier in the $128+2*(C_b-C_r)$ term). This adjustment is used to cluster very saturated colors together. For instance, one red flower may have extreme red color in the middle and relative red color along the boundary. People generally ignore this kind of difference and simply conclude that they are viewing a red flower.

Figure 3:
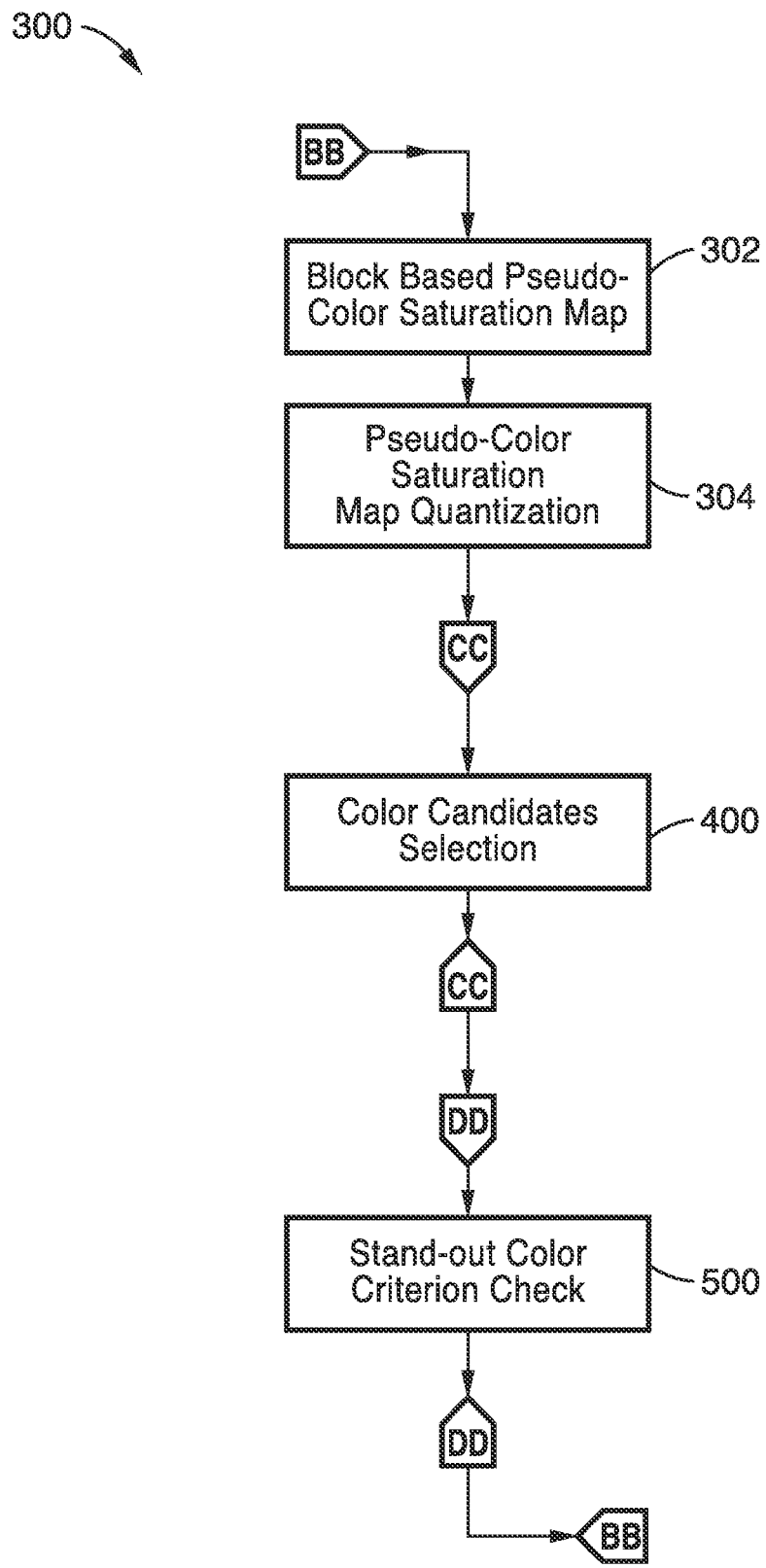
FIG. 3 is a flowchart of a pseudo-color saturation based object portrait detection method.

Refer now to FIG. 3, where the pseudo-color saturation based object portrait detection method 300 is illustrated. In the first stage, a block based pseudo-color saturation map 302 of image 102 is extracted, which is a mean pseudo-color saturation value of each 4×4 pixel block. In the current implementation, 4×4 pixel blocks are used to calculate the $C_b$ mean and the $C_r$ mean, which are added together to determine the pseudo-color saturation values in the block based pseudo-color saturation map 302.

Usually, the Cb and Cr channels only require half the resolution of the Y channel for human visual viewing without degradation. Therefore, here half-resolution Cb and Cr channels are used to minimize memory usage. Therefore, 4×4 blocks are used in Cb and Cr channels, with 8×8 blocks used in Y channel. For each 4×4 block, a single scalar is used to represent its pseudo-color saturation value. The composite of all of the 4×4 block pseudo-color saturation values in the entire image form the map.

After the block based pseudo-color saturation map 302 is extracted, the pseudo-color saturation map values are quantized 304 by the following calculation:

$$(Saturation_{pseudo-color}+4)>>3$$

where the >> symbol is the "right shift", effecting a binary divide by some number of bits. Here, the ">> 3" means "right shift three bits" or an integer divide by 8 (which does not round, and generates no remainder).

A histogram of the quantized pseudo-color saturation map 304 is then calculated for the color candidates selection 400.

While the quantized pseudo-color saturation map 304 is being calculated, the mean value of the quantized pseudo-color saturation value for the entire image 102 is calculated (denoted by $T_{level}$ in the current implementation). The idea here is to find an appropriate peak value within the histogram so that the most likely pseudo-color saturation values that belong to an object of interest can be extracted, albeit with some adjustment. In one embodiment, up to four objects of interest candidates may be selected.

After the color candidates selection 400, a final stand-out color criterion check 500 is performed, which will be described below.

Candidates Selection

Figure 4:
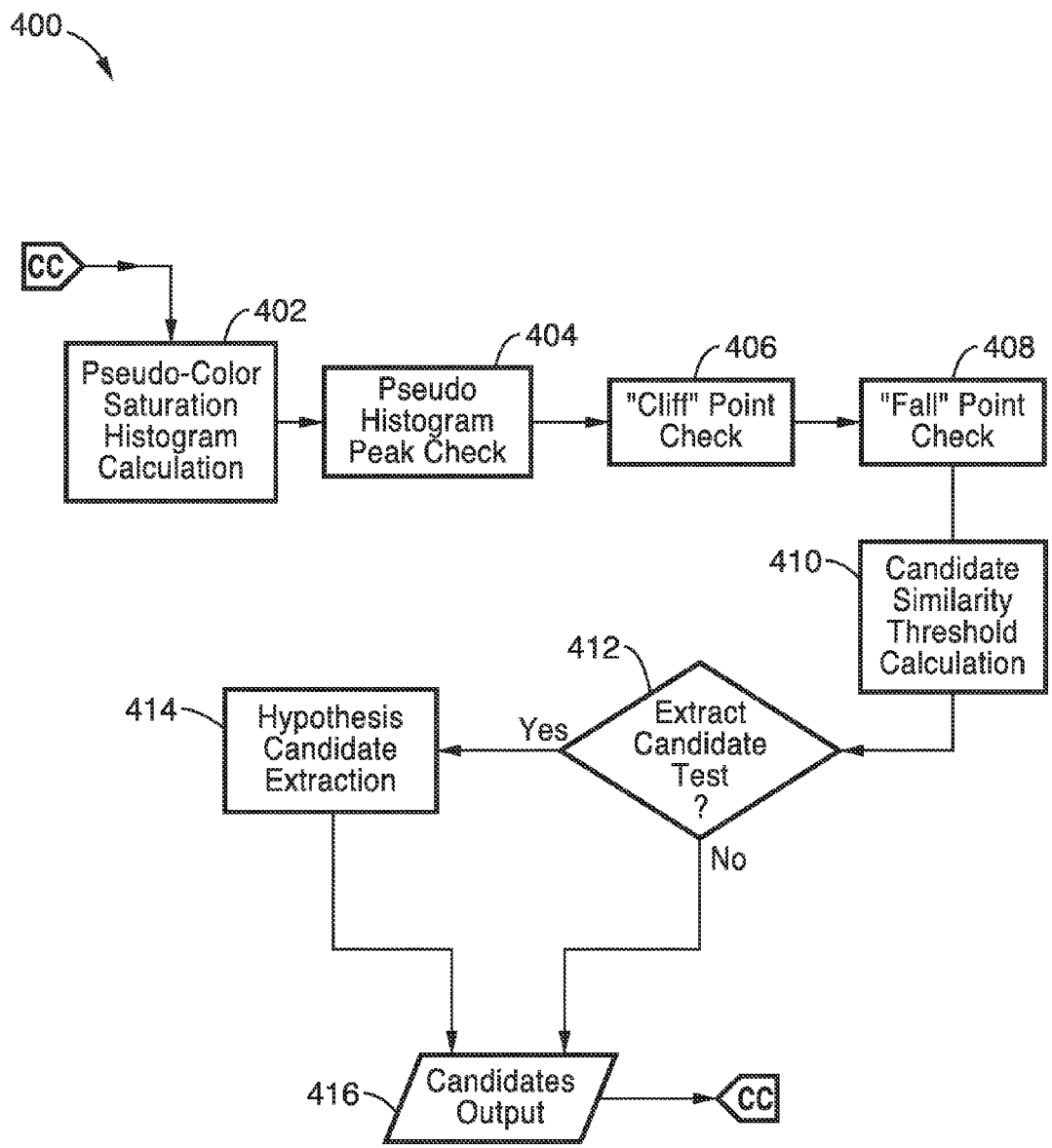
FIG. 4 is a flowchart of a method of candidate selection for pseudo-color saturation based detection.

Refer now to FIG. 4, where the Candidate Selection Procedure 400 is illustrated. Initially, a histogram Hist[v] of the quantized pseudo-color saturation values is calculated 402 from input image 102. Here, Hist[v] is equal to the number of blocks that have same quantized pseudo-color saturation value v.

Let Hist[v] denote the histogram value of the quantized pseudo-color saturation value v−1 (for a convenient implementation), the candidates selection process is performed by following procedures:

(1) If Hist[v] is greater than a small value (which is 16 in one current embodiment) and less than a large value (which is ¾ of the total number of blocks present in image 102), then the following criteria are used to find the candidates, which must satisfy at least one of the following three criteria:

(a) Pseudo Histogram Peak Check 404:

if Hist[$v$]≧Hist[$v$+1] and Hist[$v$]>Hist[$v$−1]

if Hist[$v$]≧Hist[$v$−1] and Hist[$v$]>Hist[$v$+1];

(b) "Cliff" point check 406:

if Hist[$v$]≦Hist[$v$+1]+80 and $v$<17 and no candidate has yet been found; and (c) "Fall" point check 408:

if Hist[$v$]≧Hist[$v$−1]+80 and $v$>17.

(2) The Pseudo Histogram Peak Check 404, the "Cliff" point check 406, and the "Fall" point check 408 procedures are used to find the first three candidates; a point that satisfies any of the above criteria with the largest histogram value with v>15 is selected for a fourth candidate. In doing so, a possible case where the lower v values use up all of the candidate quotas is avoided.

After each candidate is selected, its corresponding similarity threshold is calculated 410 by:

$$Temp = 2*(|v-17| >> 2)$$

$$Temp1 = |v-1-T_{level}|$$

$$m1[j] = \begin{cases} \dfrac{Temp1}{2} & \text{for } j < 3 \text{ if } Temp1 > 2*Temp \\ \dfrac{Temp1}{3} & \text{for } j = 3 \text{ if } Temp1 > 2*Temp \\ Temp & \text{Otherwise} \end{cases}$$

As previously used, the ">>" symbol is alternately referred to as the right shift, integer divide, or binary division symbol. Here, the ">>2" means to right shift 2 bits, or effect an integer divide by 4.

Next, the "Extract Candidate" test is checked 412. If no candidate has a histogram value less than 13, or if the total number of candidates is fewer than 4, then the "Hypothesis Candidate Extraction" is applied 414. Otherwise, the previously selected candidates are output at the Candidates Output 416.

"Hypothesis candidate extraction" 414 is used to select one candidate: let $$M_1 = Hist[8] + Hist[1] + Hist[2] + Hist[3] + Hist[4] + Hist[5] + Hist[6] + Hist[7].$$

If $M_1$>30, then the candidate color saturation value is set as v=4, and the similarity threshold is set to 2. Otherwise, if the first candidate pseudo-color saturation value is not equal to 12, then $$M=M_1+Hist[9]+Hist[10]+Hist[11]+Hist[12]+Hist[13]+Hist[14]. \text{ If } M>30,$$

then select v=12 as the candidate color saturation value and set 2 as the similarity threshold, which is m1[3] as previous described.

After the above procedure, the candidates are output 416 to subsequent modules for processing.

4-Partion Based Centroid Extraction and Candidate Seeds Selection

Figure 5:
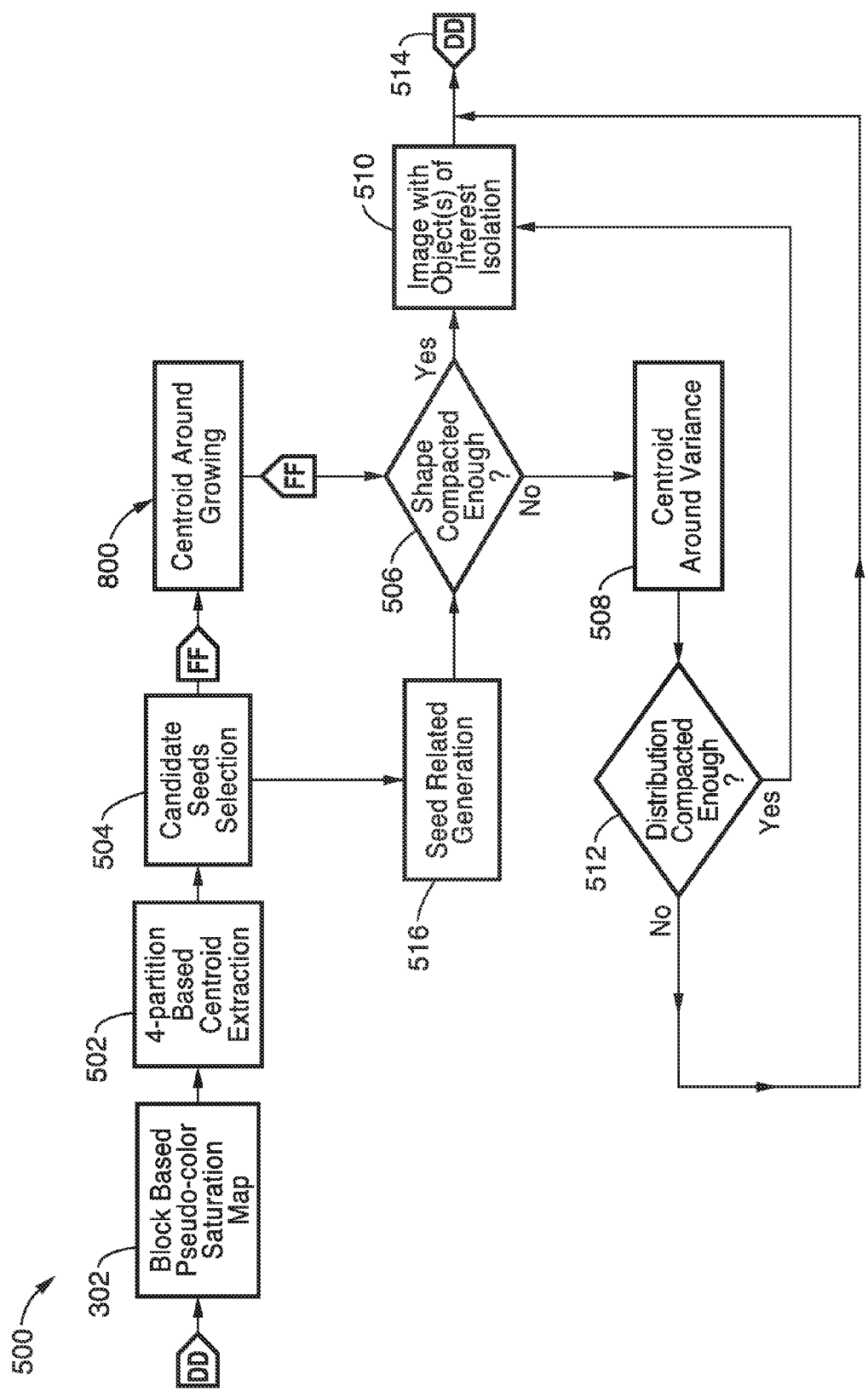
FIG. 5 is a flowchart of a stand-out color criterion check procedure.

Refer now to FIG. 5, where the stand-out color criterion check is shown 500. In the first step, a "4-Partition Based Centroid Extraction" 502 method uses the block based pseudo-color saturation map 302 previously calculated to select candidate seeds 504 for a "Centroid Around Growing" 800 process. A threshold is generated for each seed in "Seed Related Threshold Generation" 516 process, according to the following equation:

$$n = \begin{cases} 7 & \text{if } |Candidate_{pseudo-color}[j] - 16| > 10 \\ 12 & elseif |Candidate_{pseudo-color}[j] - T_{level}| > 4 \\ 10 & elseif |Candidate_{pseudo-color}[j] - 16| > 6 \\ 14 & \text{Otherwise} \end{cases}$$

as described below in the section entitled "*Sub-partition Seed Based Growing Process*". After the "Centroid Around Growing" 800 process, the compactness of the growing shape and the "Seed Related Threshold Generation" 516 result are tested with a "Shape Compacted Enough" test 506 to determine whether the current image 102 is an object portrait or not. If the compacted enough test 506 results in an object portrait, then the centroid around variance 508 step will be skipped and the object of interest isolation process 510 will be applied.

If the shape compacted enough test 506 detection result is negative based on the grown shape, then the location centroid around variance 508 is calculated for all candidates. The decision of whether an object portrait has been detected will be made correspondingly with a "Distribution Compacted Enough" 512 test. If the "Distribution Compacted Enough" 512 test result is positive, then the object of interest isolation 510 process will be applied. Otherwise, if the "Compacted Enough" 512 test result is negative, the stand-out color criterion check 500 exits 514.

Figure 6:
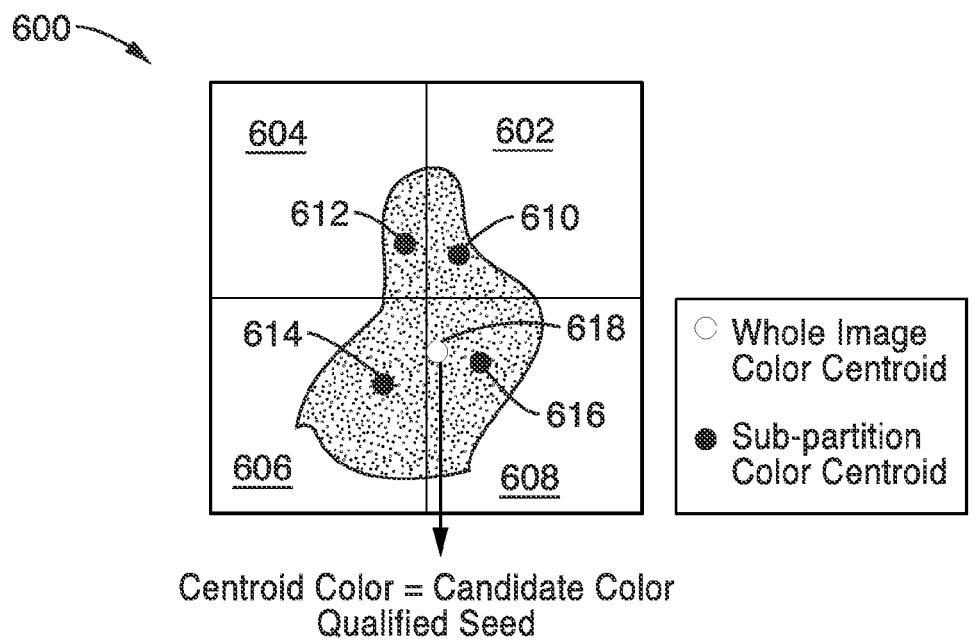
FIG. 6 is an illustration of sub-partition based centroid positions.

Refer now to FIG. 6, where an example of the 4-partition based centroid extraction process is illustrated 600. First, the image is separated into four equal partitions 602, 604, 606, and 608. For each candidate, the total number of blocks that have similar pseudo-color saturation value in the image and in each sub-partition is counted (currently, $W_{size}[j]$ is used to denote the total number of blocks belonging to each candidate) and the corresponding location centroid in each sub-partition (respectively 610, 612, 614, and 616) and the centroid of the whole image 618 is calculated. For each block in the image 102, if its pseudo-color saturation value satisfies the following condition, it is attributed into same category of the corresponding candidate:

$$|Saturation_{pseudo\text{-}color} - Candidate_{pseudo\text{-}color}[j]| \leq m[j]$$

where:
$Saturation_{pseudo\text{-}color}$ is the pseudo color saturation value of the current block,
$Candidate_{pseudo\text{-}color}[j]$ is the $j^{th}$ candidate pseudo color saturation value, and $m[j]$ is the $j^{th}$ similarity threshold in the following equation $$Temp = 2*(|v-17| >> 2)$$

$$Temp1 = |v - 1 - T_{level}|$$

$$m1[j] = \begin{cases} \dfrac{Temp1}{2} & \text{for } j < 3 \text{ if } Temp1 > 2*Temp \\ \dfrac{Temp1}{3} & \text{for } j = 3 \text{ if } Temp1 > 2*Temp \\ Temp & \text{Otherwise} \end{cases}$$

as described above in the section entitled "*Candidates Selection*".

The location centroid of the blocks that are in same category as the candidate is calculated by the following equations. Basically, the mean value of horizontal location and vertical location are calculated:

$$Centroid_{Horizontal} = \frac{1}{N} \sum_{BK(i,j) \in candidates} j$$

$$Centroid_{Vertical} = \frac{1}{N} \sum_{BK(i,j) \in candidates} i$$

where BK(i, j) denotes the blocks in position (i, j) of image 102.

After the location centroid is obtained, the pseudo-color saturation value of the centroid located block is checked. If it is in the same category of the candidate, it is used as a seed and a center around growing process is used to grow a shape around the seed.

Growing Process

Figure 7:
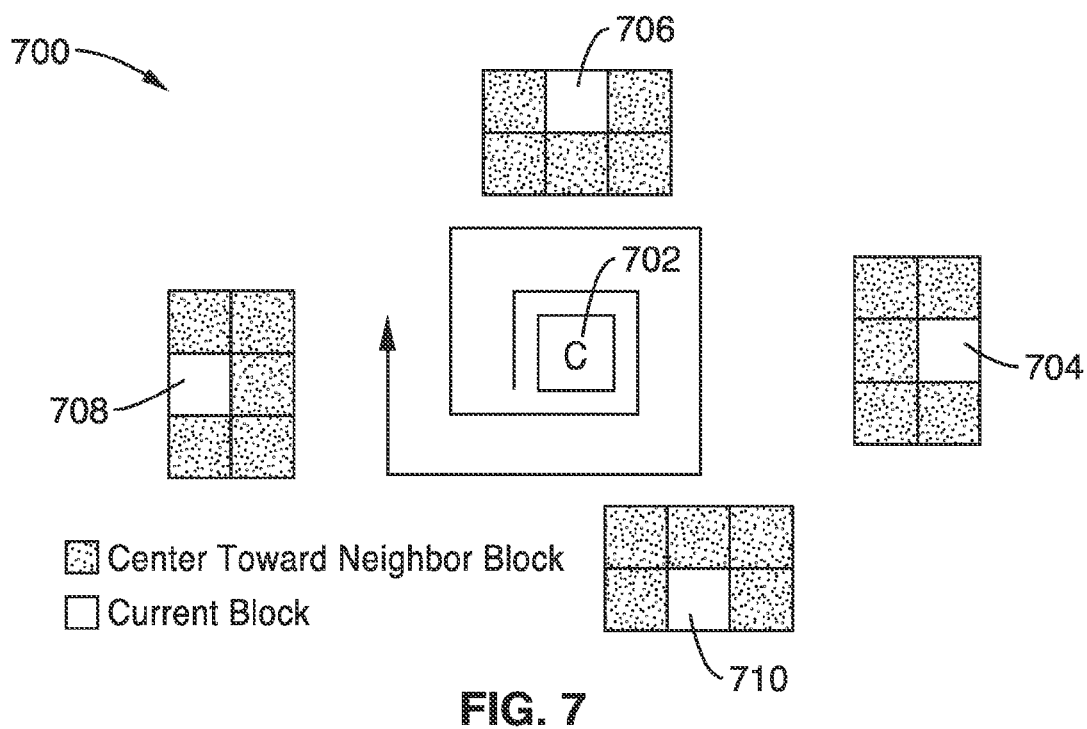
FIG. 7 is an illustration of a center around growing process.

Refer now to FIG. 7, where an overview of the growing process is illustrated 700 by using the selected seed as center. Here "C" denotes the seed block 702 and the white color blocks 704, 706, 708, and 710 denote blocks on the growing path. The growing process is conducted as follows starting from the blocks neighboring the center.

For each current block (white color block), neighboring blocks include five blocks denoted as "Center Toward Neighbor Blocks". For instance, in the left grouping of blocks (having block 708) and right grouping of blocks (having block 704) have neighboring blocks above, below, and three toward the center (Center Toward Neighbor Blocks). Similarly, for the bottom row of blocks (containing block 710) and the top column of blocks (containing block 706) have neighboring blocks to the left, to the right, and three toward the center (Center Toward Neighbor Blocks).

If a block satisfies the following condition:

$$|Saturation_{pseudo\text{-}color} - Candidate_{pseudo\text{-}color}[j]| \leq m[j]$$

and at least one of its Center Toward Neighbor Blocks has been denoted as "C", then denote the current block as "C". Recall that m[j] is the $j^{th}$ similarity threshold previously described.

Horizontally move the upper row of blocks up by one row, the lower row of blocks down by one row, the left column of blocks to the left by one column and right column of blocks to the right by one column. Repeat the above procedures in a circular growing pattern until the boundary of the image or non block is denote as "C" in one round of processing.

Figure 8:
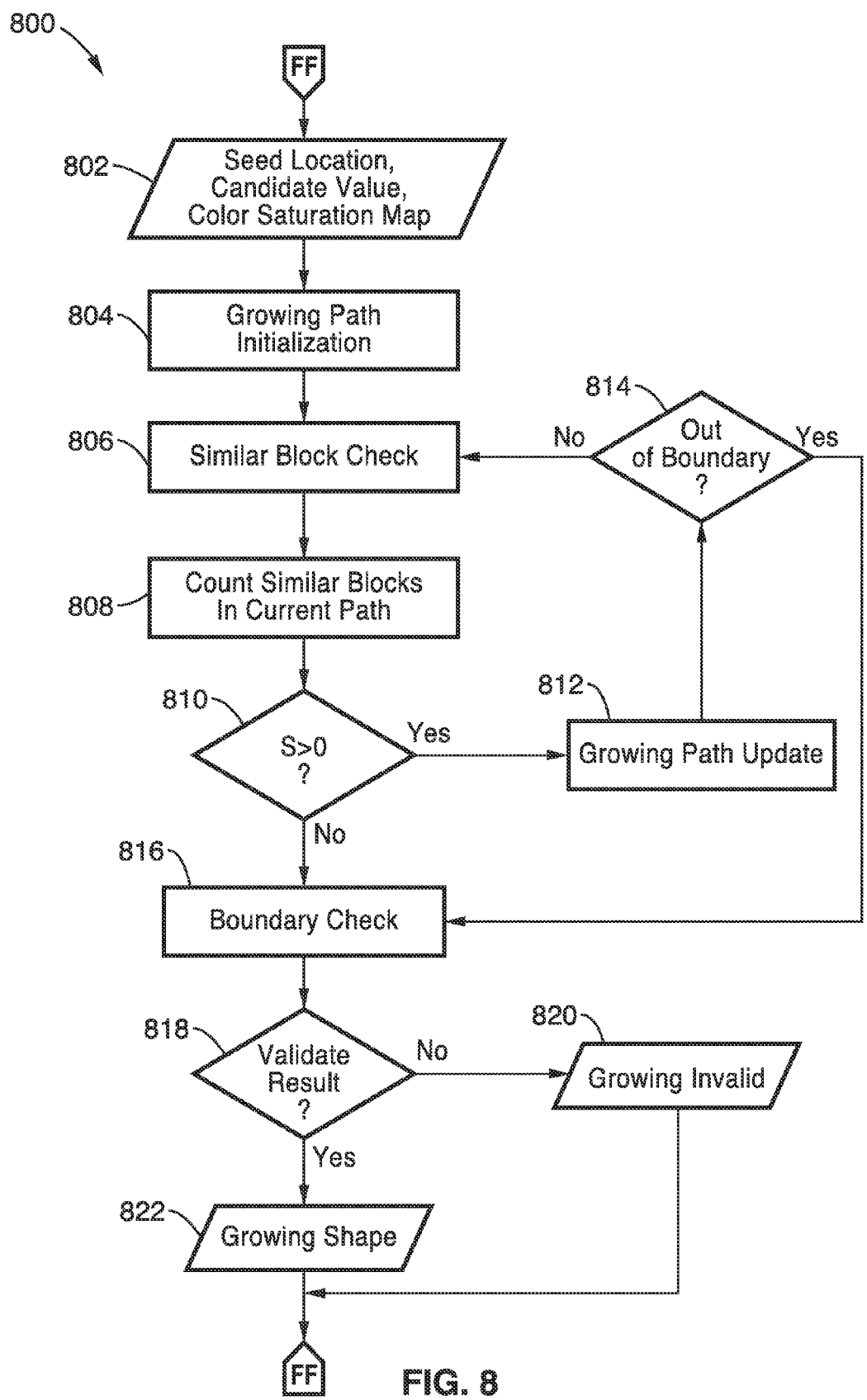
FIG. 8 is a flowchart of the center around growing process.

Refer now to FIG. 8 for a detailed flow chart of the "Centroid Around Growing" process 800.

Initially, the seed location, the candidate pseudo-color saturation value and color saturation map are input 802 to the process.

Next, the growing path is initialized 804 as the eight neighbor blocks around the seed location. Refer back to FIG. 7, where the growing process is illustrated 700 by using the selected seed as center. Here "C" denotes the seed block 702 and the white color blocks 704, 706, 708, and 710 denote blocks on the growing path. The growing process is conducted starting from the block left neighbor to the center.

For each block in the current growing path, if $$|Saturation_{pseudo\text{-}color} Candidate_{pseudo\text{-}color}[j]| \leq m[j]$$

is satisfied, and at least one of its "Center Toward Neighbor Blocks" has been denoted as "C", then denote the current block as "C". This comprises the "Similar Blocks Check" 806.

Next, the total number, S, of similar blocks denoted as "C" in the current path are counted 808. If S is greater than zero, the growing path is updated 812. Otherwise, a non-block is denoted as "C" in the current path, and the growing process is stopped. Then an "Out of Boundary" 814 check is made. If the current growing path is not "Out of Boundary" 814, then the process continues with the "Similar Blocks Check" 806 described above.

During the "Growing Path Update" 812, all the blocks immediately neighboring the previous path are selected as the current path. This may be better illustrated than described.

Figure 9:
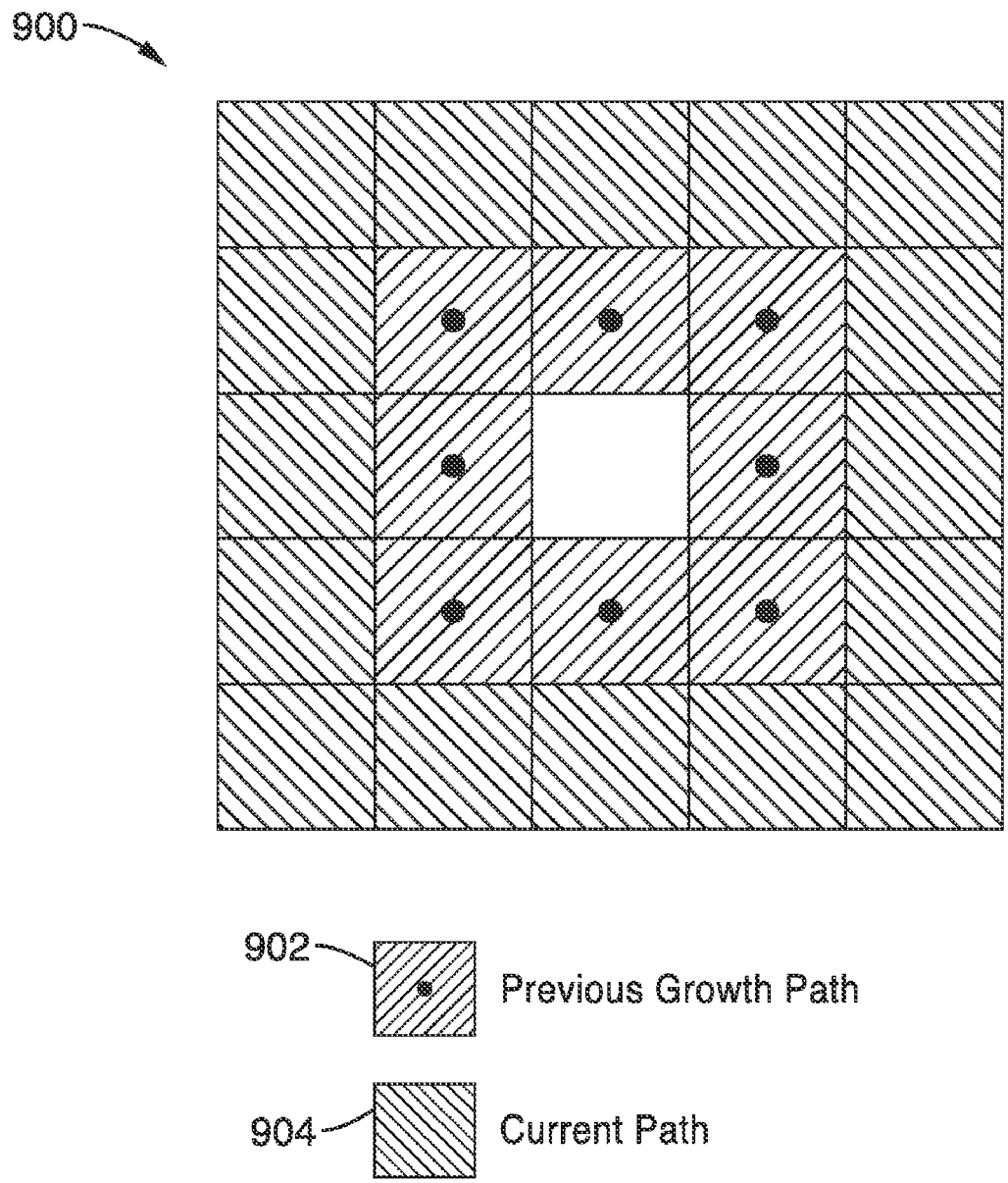
FIG. 9 is a detailed view of a growing path.

Refer now to FIG. 9, where one set of hatched boxes 902 represents the previous growing path and the other set of differently hatched boxes 904 surround the yellow boxes represent the updated current growing path.

Refer back again to FIG. 8. If the current growing path is not "Out of Boundary" 814, then the loop containing "Similar Block Check" 806 repeated until the image boundary is reached. The image boundary is reached when an "Out of Boundary" 814 condition is true.

When either the "Out of Boundary" 814 is true, or the number of similar blocks S is not greater than 0, then the "Boundary Check" 816 module is reached. Here, the blocks in the image boundary and denoted as "C" are counted along each side of the image boundary.

If the number of the blocks denoted as "C" along this boundary is greater than a certain threshold in "Validate Result" test 818, the "Growing Invalid" 820 indication may be output. Otherwise, the "Growing Shape" indication is output 822. Regarding the threshold in 818, currently, ⅛ of the height (the total number of blocks vertically measured in image 102) is used for the left and right image boundary thresholds, ⅛ of width (the total number of blocks horizontally measured) is used for the top image boundary threshold, and ¼ of width (the total number of blocks horizontally measured) is used for the bottom image boundary threshold.

Figure 10:
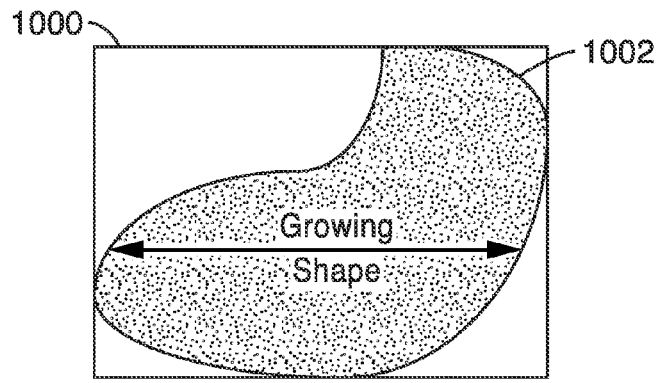
FIG. 10 is an illustration of a growing shape with a rectangular bounding box generated around a growing shape.

Refer now to FIG. 10, where a rectangular bounding box 1000 has been generated around the growing shape 1002 is shown. After the growing process, the total number of the blocks within the shape is counted and recorded as the growing shape size and the growing shape boundary is returned.

If the growing shape size is greater than half of $W_{size}[j]$ and greater than 30, then the following procedure is used to calculate the compactness value:

$$\text{Compactness}[j] = \frac{32 * Size_{growing-shape}}{Size_{bounding-box}} + \frac{|Candidate_{pseudo-color}[j] - 16|}{2}$$

If the bounding box touches any image boundary, the compactness value will be reduced by two. If the bounding box touches a top image boundary and its pseudo-color saturation value is greater than 10, then the compactness value is invalid. If the bounding box touches a left and a right image boundary, then the compactness value is set as invalid (set as the number "2" in the code).

Sub-Partition Seed Based Growing Process

After the above process, the candidate will the highest compactness value is selected. This value is compared to a content adaptive threshold which is calculated by following:

$$n = \begin{cases} 7 & \text{if } |Candidate_{pseudo-color}[j] - 16| > 10 \\ 12 & \text{elseif} |Candidate_{pseudo-color}[j] - T_{level}| > 4 \\ 10 & \text{elseif} |Candidate_{pseudo-color}[j] - 16| > 6 \\ 14 & \text{Otherwise} \end{cases}$$

If the highest compactness value is larger than the above threshold, the object portrait is detected. The final bounding box for the object of interest isolation is the selected candidate growing shape bounding box extending by two toward each side.

If the highest compactness value is less than the above threshold, the sub-partition based process is enabled for each candidate that does not have qualified whole image seed. Besides that, the following condition needs to be satisfied before conducting sub-partition based growing:

|Candidate$_{pseudo-color}$[j]−16|>5 or

|Candidate$_{pseudo\,color}$[j]−T$_{level}$|>3

After the growing process, if the following condition is satisfied, the object portrait is detected and the growing shape is used as the object of interest isolation result.

The growing shape size should great or equal to half of the rectangle growing shape bounding box size. The growing shape should not touch any image boundary.

The growing shape size should be larger than ½ of the total number of blocks with similar value as the seed in the whole picture and also greater than 30.

Location Centroid Around Variance Base Detection

If both whole image and the sub-partition based process failed to detect any object, a location centroid around variance based approach is enabled to do the detection as the following procedure for each candidate.

If the total number of candidate blocks in the whole image is larger than a threshold which is 30 in the current implementation, the location centroid around variance is calculated for the upper half picture and the whole picture separately by the following equation:

$$VAR_{hor} = \frac{1}{N}\left(\sum_{BK(i,j)\in candidate}(j - Centroid_{Horizontal})^2\right)$$

$$VAR_{ver} = \frac{1}{N}\left(\sum_{BK(i,j)\in candidate}(i - Centroid_{Vertical})^2\right)$$

$$VAR_{CA} = VAR_{ver} + VAR_{hor}$$

A compactness value is then calculated by the following equation:

$$\text{Compactness}[j] = \frac{(8 - W_{size}[j]/8) * W_{size}[j]^2}{VAR_{CA}}$$

Select the candidate with the highest compactness value and compared to the adaptive threshold "n" we calculated before. If the candidate compactness value is larger than the threshold, the picture is considered as "object portrait" and the following equations are used to calculate the width and height of a rectangle bounding box.

$$Bounding_{width} = \frac{VAR_{hor} * 8 * \sqrt{W_{Size}}}{VAR_{ver} * \left(8 - \frac{1}{4}|Candidate_{pseudo-color} - 16|\right)}$$

$$Bounding_{height} = \frac{VAR_{ver} * Bounding_{width}}{VAR_{hor}}$$

If the image is vertically posed (height is larger than width), the bounding box height is increased by a certain amount (6 in the current implementation).

Object of Interest Isolation

If object portrait is detected by either whole image center growing process or location centroid around variance based approach, the object of interest isolation is by following procedure.

Initialize a rectangle bounding box created either by center around growing process or location centroid around variance based approach Check each block within the bounding box, if its saturation value is closed to the extracted candidate saturation value, check its eight-neighbor blocks. Otherwise, denote this block as non-object block If any two of the eight-neighbor blocks have the saturation value close to the candidate saturation value, denote this block as object block. Otherwise, denote this block as non-object block.

After processing all the blocks within the bounding box, for each row of object blocks, find the most left object block and most right object block and denote all the blocks between them as object block; for each column of blocks, find the top object block and bottom object block and denote all the blocks between them as object blocks.

The generated convex set is the isolated object of interest.

VI. Block Intensity Based Object Portrait Detection

Besides color, another important feature that differentiates the object with its surrounding area is the luminance intensity. A very bright or dark object is easy to catch human being's attention. There are many objects can be differentiate from the surrounding area with only intensity information. For instance, flower, animal and many manmade objects. Motivated by this observation, a stand-out intensity based object portrait detection scheme was developed.

Figure 11:
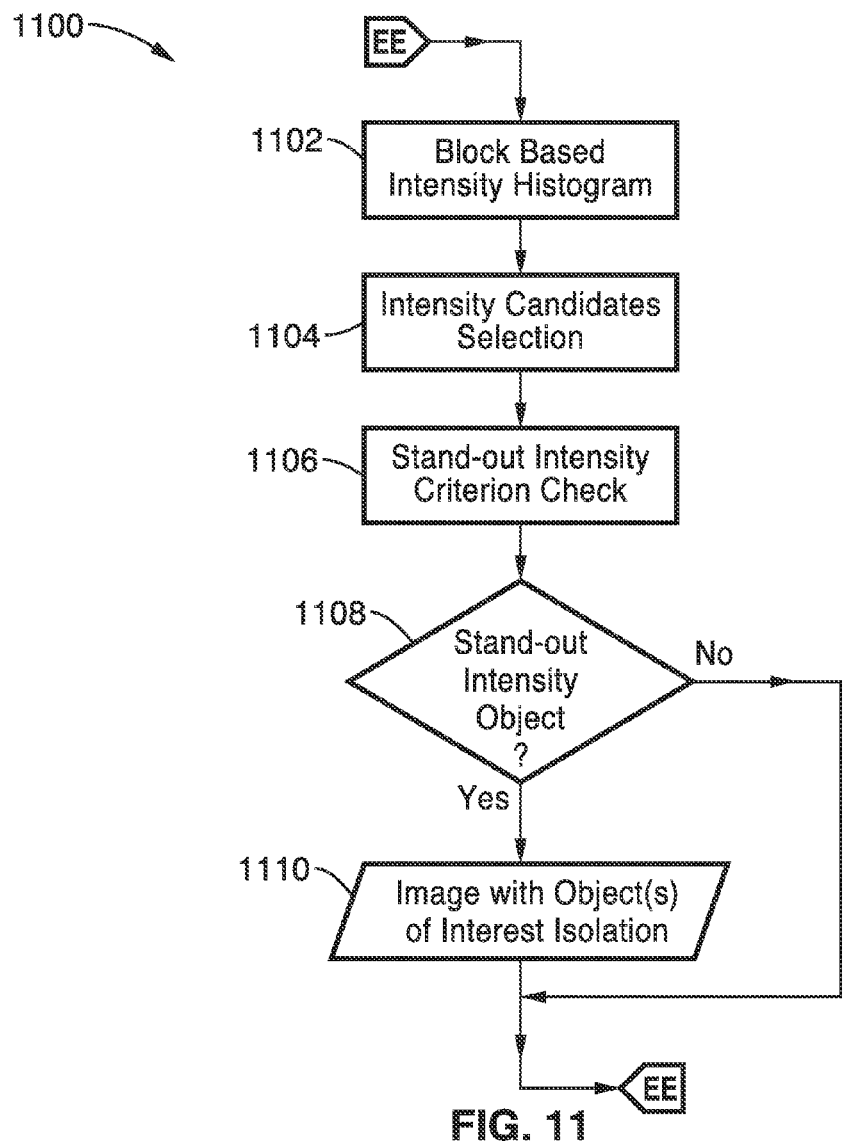
FIG. 11 is a flowchart of a stand-out intensity based object portrait detection method.

The stand-out intensity based object portrait detection scheme is illustrated in FIG. 11. Initially, a block based intensity map is extracted. It is the mean luminance value of each block. In one embodiment, an 8×8 block Y mean is used as the block intensity value. After the intensity map is extracted, the intensity value is quantized by $(BK_{intensity}+8)>>4$.

A "Block Based Intensity Histogram" 1102 of the quantized block intensity map is then calculated for block intensity candidates selection. At the same time, the mean value of the quantized intensity value for the whole picture is calculated (denoted by T_level in a current embodiment). The basic idea is to find the appropriate peak value in the histogram with some adjustment such that the most possible stand-out intensity values that belong to the object of interest can be extracted. In one present embodiment, up to four candidates are selected.

Let Hist[v] denote the histogram value of the quantized intensity value v−1 (for the convenience of implementation), the candidates selection process is performed as follows.

If Hist[v] is greater than a small value (30 in the current implementation); less than a big value (¾ of the total number of blocks in the whole image); and $|v-1-T_{level}|>1$, then the following criteria is used to find the candidates:

If Hist[$v$]>Hist[$v$+1] and Hist[$v$]>Hist[$v$−1]

Use the above procedures to find the first three candidates. For the fourth candidate, the biggest histogram peak.

After the candidates selection, the similar process as pseudo-color saturation based seed selection and center around growing process is conducted to do the object portrait detection. Compared to pseudo-color saturation based method, the similarity threshold is different to compare the block similarity with the candidate. In the stand-out intensity based method, the similarity threshold is calculated by following $$Temp = |v - 8|$$
$$m1[j] = \begin{cases} 2 & \text{if } Temp < 2 \\ 3 & \text{Otherwise} \end{cases}$$

When the whole image based centroid is selected as a seed for center around growing, m1[j]+1 is used for first step growing. If the first step growing return negative, the second step growing is skipped. Otherwise, if the first step growing shape touches the image boundary, m1[j] is used for second step growing. The growing result with bigger compactness value is selected. Also, the growing shape size of the sub-partition based approach should be greater than ⅜ $W_{size[j]}$.

The object isolation approach is also a little different. For stand-out intensity based object of interest isolation, the object of interest isolation is by following procedure:

(a) Initialize a rectangle bounding box created by center around growing process.

(b) Check each block within the bounding box, if its intensity value is closed to the extracted candidate intensity value (the difference is less and equal to 3), check its eight-neighbor blocks. Otherwise, denote this block as non-object block.

(c) If at least three of the eight-neighbor blocks have the intensity value close to the candidate intensity value (the difference is less and equal to 3), denote this block as object block. Otherwise, denote this block as non-object block.

(d) After processing all the blocks within the bounding box, for each row of object blocks, find the most left object block and most right object block and denote all the blocks between them as object block; For each column of blocks, find the top object block and bottom object block and denote all the blocks between them as object blocks.

(d) The generated convex set is the isolated object of interest.

Embodiments of the present invention are described with reference to flowchart illustrations of methods and systems according to embodiments of the invention. These methods and systems can also be implemented as computer program products. In this regard, each block or step of a flowchart, and combinations of blocks (and/or steps) in a flowchart, can be implemented by various means, such as hardware, firmware, and/or software including one or more computer program instructions embodied in computer-readable program code logic. As will be appreciated, any such computer program instructions may be loaded onto a computer, including without limitation a general purpose computer or special purpose computer, or other programmable processing apparatus to produce a machine, such that the computer program instructions which execute on the computer or other programmable processing apparatus create means for implementing the functions specified in the block(s) of the flowchart(s).

Accordingly, blocks of the flowcharts support combinations of means for performing the specified functions, combinations of steps for performing the specified functions, and computer program instructions, such as embodied in computer-readable program code logic means, for performing the specified functions. It will also be understood that each block of the flowchart illustrations, and combinations of blocks in the flowchart illustrations, can be implemented by special purpose hardware-based computer systems which perform the specified functions or steps, or combinations of special purpose hardware and computer-readable program code logic means.

Furthermore, these computer program instructions, such as embodied in computer-readable program code logic, may also be stored in a computer-readable memory that can direct a computer or other programmable processing apparatus to function in a particular manner, such that the instructions stored in the computer-readable memory produce an article of manufacture including instruction means which implement the function specified in the block(s) of the flowchart(s). The computer program instructions may also be loaded onto a computer or other programmable processing apparatus to cause a series of operational steps to be performed on the computer or other programmable processing apparatus to produce a computer-implemented process such that the instructions which execute on the computer or other programmable processing apparatus provide steps for implementing the functions specified in the block(s) of the flowchart(s).

From the discussion above it will be appreciated that the invention can be embodied in various ways, including the following:

1. A method of object portrait processing, comprising: (a) providing an input image; (b) determining on a computer whether the input image is sunset-like; (c) if the input image is not sunset-like, then determining if one or more objects of interest are present; and (d) outputting to a computer readable memory object of interest information.

2. The method of embodiment 1, wherein the step of determining whether the input image is sunset-like comprises: performing the following sunset-like scene checks until at least one check is logically "false", wherein the checks consist of: a Bright Block Color_sat Check; a Corner Bright Block Check; a Dark Block Check; an Overall Intensity Check; and a Boundary Block Variance Check.

3. The method of embodiment 2, further comprising: outputting a logically "true" sunset scene detection result when all of the sunset-like scene checks are logically "true".

4. The method of embodiment 1, wherein the step of determining if one or more objects of interest are present comprises performing pseudo-color saturation based detection.

5. The method of embodiment 1, wherein the step of determining if one or more objects of interest are present comprises performing intensity-based detection.

6. The method of embodiment 1, wherein the step of determining if one or more objects of interest are present comprises: performing pseudo-color saturation based detection; and performing intensity-based detection.

7. The method of embodiment 6, wherein: (a) if a pseudo-color saturation output, from the performing pseudo-color saturation based detection step, is greater than zero; or (b) if an intensity output, from the performing intensity-based detection step, is greater than zero; then (c) performing an object of interest isolation step.

8. The method of embodiment 6, wherein the performing pseudo-color saturation based detection step comprises: (a) generating a block based pseudo-color saturation map; (b) performing a pseudo-color saturation map quantization; (c) performing a color candidates selection; and (d) performing a stand-out color criterion check.

9. The method of embodiment 8, wherein the performing the color candidates selection step comprises outputting candidates from the following tests: (a) performing a pseudo-color saturation histogram calculation; (b) performing a pseudo histogram peak check; (c) performing a "Cliff" point check; (d) performing a "Fall" point check; (d) performing a candidate similarity threshold calculation; (e) performing an extract candidate check; and (f) if the extract candidate check results in a logical "true" output, then performing a hypothesis candidate extraction.

10. The method of embodiment 8, wherein the stand-out color criterion check step comprises: (a) calculating a block based pseudo-color saturation map; (b) performing a 4-partition based centroid extraction; (c) performing a candidate seeds selection; and (d) performing a centroid around growing step.

11. The method of embodiment 10, wherein the centroid around growing step comprises: (a) performing a growing path initialization; (b) performing a similar block check; (c) performing a boundary check; and (d) if a validate check is true, then outputting a growing shape.

12. A computer and programming executable on the computer configured for performing the method of object portrait processing of embodiment 1.

13. A computer program, stored on a computer readable medium, and executable on a computer for performing the method of object portrait processing of embodiment 12.

14. An apparatus, comprising the computer and programming of embodiment 12.

15. The apparatus of embodiment 14, further comprising: a display, whereupon object of information may be displayed.

16. An apparatus for detecting one or more objects of interest within an image, comprising: (a) a computer with programming executable on the computer for (i) determining if an input image is sunset-like, and (ii) if the input image is not sunset-like, then (iii) determining if one or more objects of interest are present; and (b) a computer readable memory comprising object of interest information when the input image is not sunset-like.

17. The apparatus of embodiment 16, further comprising: a display, whereupon object of interest information may be displayed.

Although the description above contains many details, these should not be construed as limiting the scope of the invention but as merely providing illustrations of some of the presently preferred embodiments of this invention. Therefore, it will be appreciated that the scope of the present invention fully encompasses other embodiments which may become obvious to those skilled in the art, and that the scope of the present invention is accordingly to be limited by nothing other than the appended claims, in which reference to an element in the singular is not intended to mean "one and only one" unless explicitly so stated, but rather "one or more." All structural, chemical, and functional equivalents to the elements of the above-described preferred embodiment that are known to those of ordinary skill in the art are expressly incorporated herein by reference and are intended to be encompassed by the present claims. Moreover, it is not necessary for a device or method to address each and every problem sought to be solved by the present invention, for it to be encompassed by the present claims. Furthermore, no element, component, or method step in the present disclosure is intended to be dedicated to the public regardless of whether the element, component, or method step is explicitly recited in the claims. No claim element herein is to be construed under the provisions of 35 U.S.C. 112, sixth paragraph, unless the element is expressly recited using the phrase "means for."

What is claimed is:

1. A method of object portrait processing, comprising:
   (a) providing an input image;
   (b) determining on a computer whether the input image is sunset-like;
   (c) if the input image is not sunset-like, then determining if one or more objects of interest are present;
   (d) outputting to a computer readable memory object of interest information;
   (e) wherein said step of determining whether the input image is sunset-like comprises performing the following sunset-like scene checks until at least one check is logically "false", wherein the checks consist of:
      a. a Bright Block Color_sat Check;
      b. a Corner Bright Block Check;
      c. a Dark Block Check;
      d. an Overall Intensity Check; and
      e. a Boundary Block Variance Check; and
   (f) outputting a logically "true" sunset scene detection result when all of the sunset-like scene checks are logically "true".

2. The method of claim 1, wherein the step of determining if one or more objects of interest are present comprises performing pseudo-color saturation based detection.

3. The method of claim 1, wherein the step of determining if one or more objects of interest are present comprises performing intensity-based detection.

4. The method of claim 1, wherein the step of determining if one or more objects of interest are present comprises:
   performing pseudo-color saturation based detection; and
   performing intensity-based detection.

5. The method of claim 4, wherein:
   (a) if a pseudo-color saturation output, from the performing pseudo-color saturation based detection step, is greater than zero; or
   (b) if an intensity output, from the performing intensity-based detection step, is greater than zero; then
   (c) performing an object of interest isolation step.

6. The method of claim 4, wherein the performing pseudo-color saturation based detection step comprises:
   generating a block based pseudo-color saturation map;
   performing a pseudo-color saturation map quantization;
   performing a color candidates selection; and
   performing a stand-out color criterion check.

7. The method of claim 6, wherein the performing the color candidates selection step comprises outputting candidates from the following tests:
   performing a pseudo-color saturation histogram calculation;
   performing a pseudo histogram peak check;
   performing a "Cliff" point check;
   performing a "Fall" point check;
   performing a candidate similarity threshold calculation;
   performing an extract candidate check; and
   if the extract candidate check results in a logical "true" output, then performing a hypothesis candidate extraction.

8. The method of claim 6, wherein the stand-out color criterion check step comprises:
   calculating a block based pseudo-color saturation map;
   performing a 4-partition based centroid extraction;
   performing a candidate seeds selection; and
   performing a centroid around growing step.

9. The method of object portrait processing of claim 8, wherein the centroid around growing step comprises:
   performing a growing path initialization;
   performing a similar block check;
   performing a boundary check; and
   if a validate check is true, then outputting a growing shape.

10. A computer and programming executable on said computer for performing the method of object portrait processing of claim 1.

11. A computer program, stored on a non-transitory computer readable medium, and executable on a computer for performing the method of object portrait processing of claim 10.

12. An apparatus, comprising the computer of claim 10.

13. The apparatus of claim 12, further comprising a display, whereupon object of information may be displayed.

14. An apparatus for detecting one or more objects of interest within an image, comprising:
   (a) a computer and programming executable on said computer for
      (i) determining if an input image is sunset-like; and
      (ii) if the input image is not sunset-like, then determining if one or more objects of interest are present; and
   (b) a computer readable memory comprising object of interest information when the input image is not sunset-like;
   (c) said programming for performing the following sunset-like scene checks until at least one check is logically "false", wherein the checks consist of:
      a. a Bright Block Color_sat Check;
      b. a Corner Bright Block Check;
      c. a Dark Block Check;
      d. an Overall Intensity Check; and
      e. a Boundary Block Variance Check; and
   (d) said programming for outputting a logically "true" sunset scene detection result when all of the sunset-like scene checks are logically "true".

15. The apparatus of claim 14, further comprising a display, whereupon object of interest information may be displayed.

* * * * *